Oct. 12, 1948.  S. M. RANSOME  2,451,447
HOBBING MACHINE
Filed Feb. 13, 1942  2 Sheets-Sheet 1
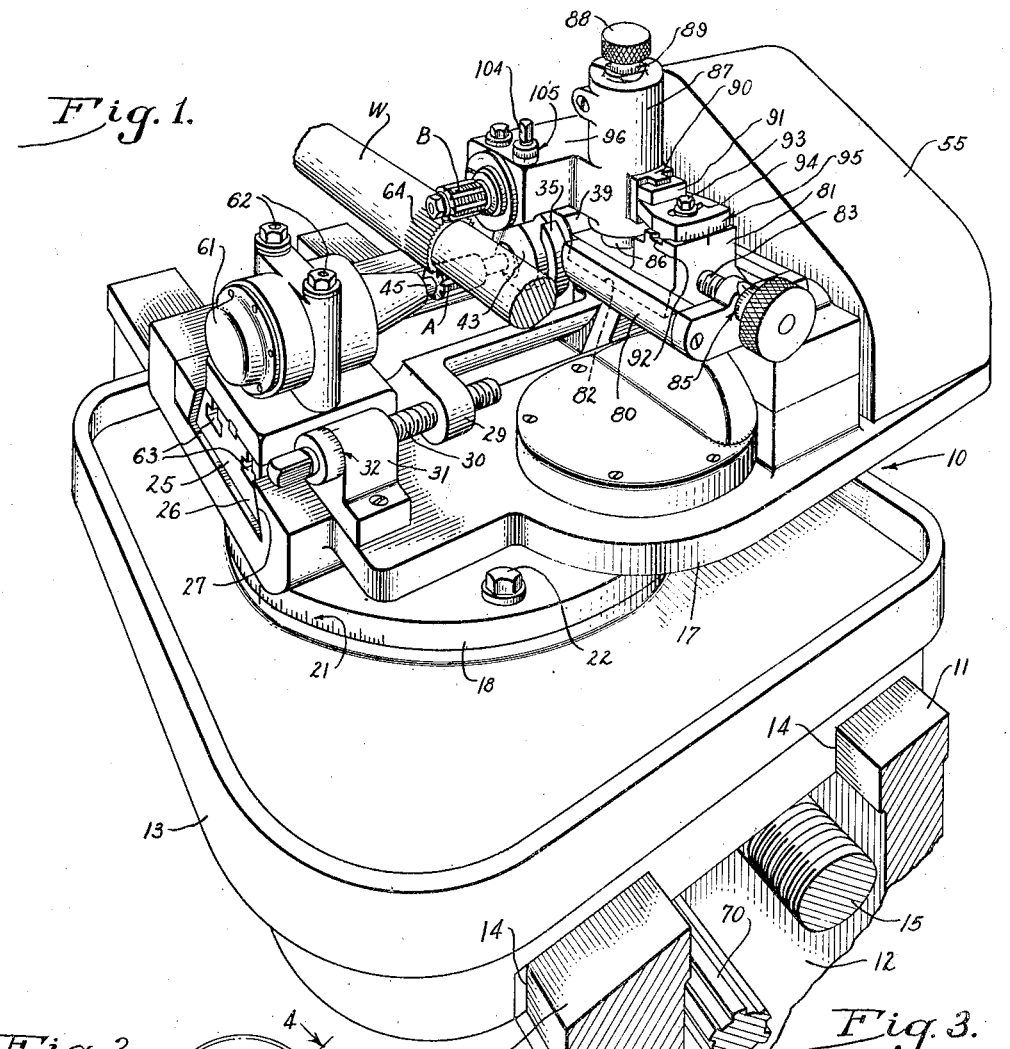
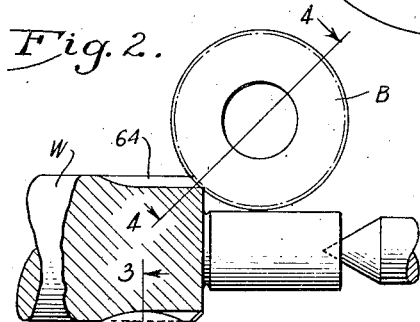
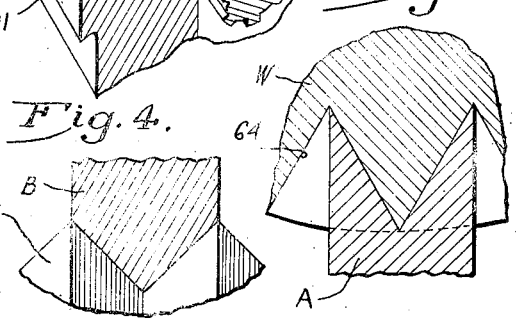
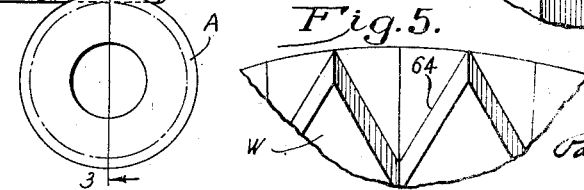
INVENTOR
Stafford M. Ransome
BY
ATTORNEYS

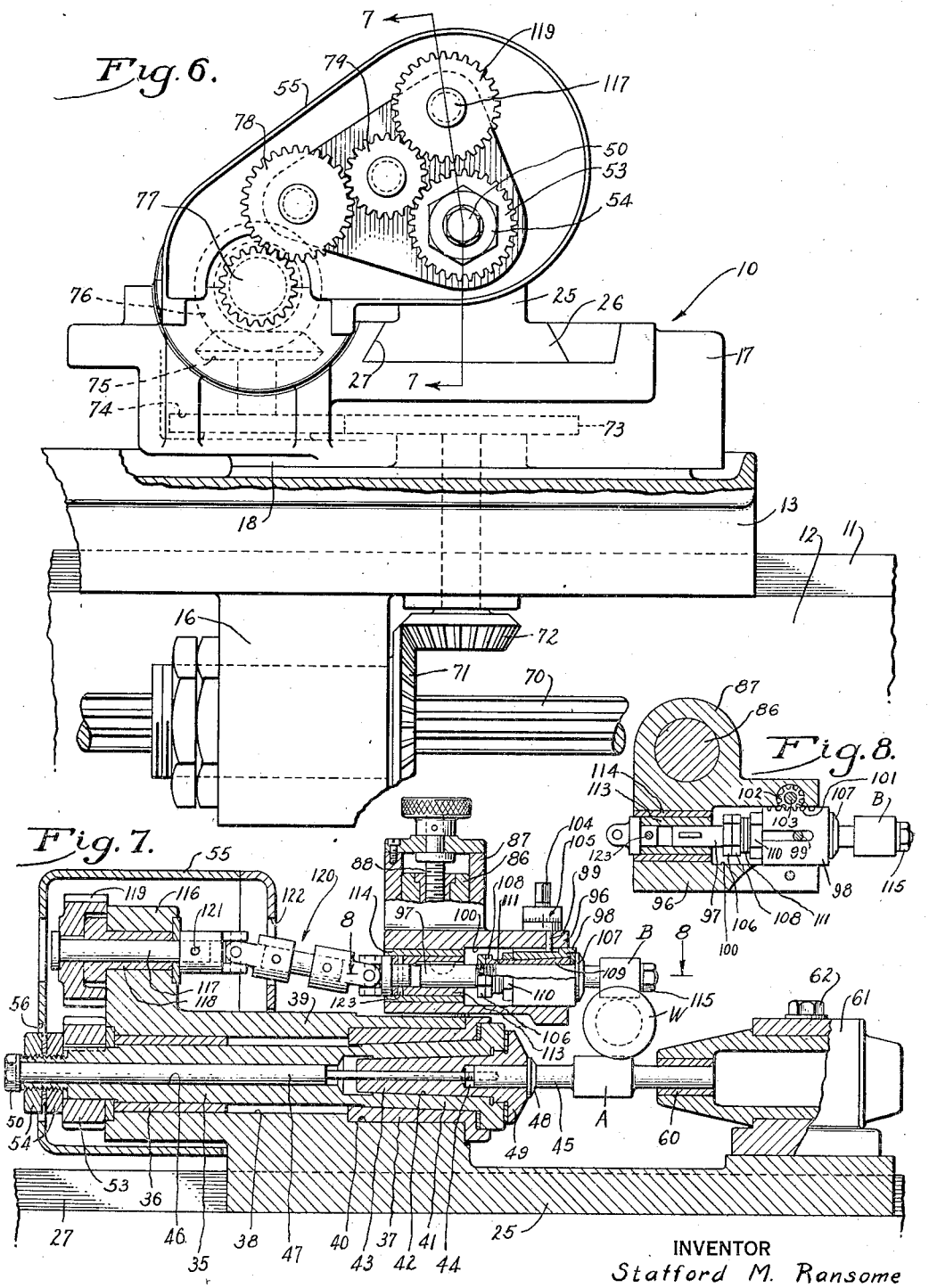

Patented Oct. 12, 1948

2,451,447

UNITED STATES PATENT OFFICE 2,451,447

HOBBING MACHINE

Stafford M. Ransome, Rockford, Ill., assignor to Barber-Colman Company, Rockford, Ill., a corporation of Illinois Application February 13, 1942, Serial No. 430,780

6 Claims. (Cl. 90—4)

The present invention relates to improvements in hobbing machines, and has particuular reference to a new and improved machine for hobbing spline parts and gears, having end-chamfered teeth.

One of the objects of the invention is to provide a novel hobbing machine which is capable of producing in a single operation a toothed part having a chamfered or beveled end edge.

It is a further object of the invention to provide a new and improved hobbing machine capable of effecting a substantial saving of time by performing two hobbing operations simultaneously, one for producing teeth on a work piece, and the other for chamfering the ends of the teeth so produced.

A further object of the invention is to provide a novel hobbing machine in which two hobs are mounted for simultaneous operation on a work piece, said hobs being conjointly adjustable longitudinally, angularly and transversely with respect to the axis of said work piece, one of said hobs being individually adjustable toward and away from the other as well as longitudinally and angularly with respect to the axis of the other and further adjustable transversely in a plane perpendicular to the common plane of the hob axes.

Another object resides in the provision of a new and improved hobbing machine in which a pair of relatively adjustable hobs are mounted for adjusting movement with respect to a work piece and driven in exact timed relation from a common power source.

Further objects and advantages will become apparent as the following description proceeds.

In the accompanying drawings,

Figure 1 is a perspective view of a cutter support mounted on the ways of a hobbing machine, and embodying the features of the present invention.

Fig. 2 is a fragmentary sectional view on an enlarged scale taken axially of the work piece, and transversely of the hobs and showing the relation of the hobs with the work.

Figs. 3 and 4 are sectional views taken along lines 3—3 and 4—4, respectively, of Fig. 2.

Fig. 5 is a fragmentary end elevational view of the formed teeth on the work piece.

Fig. 6 is an enlarged rear elevational view partially in section and illustrating the hob support of Fig. 1.

Fig. 7 is a transverse sectional view taken along line 7—7 of Fig. 6.

Fig. 8 is a detail horizontal sectional view taken on line 8—8 of Fig. 7.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, wherein I have illustrated a preferred embodiment of my invention, and more particularly to Fig. 1 thereof, a hob support (generally indicated at 10) is mounted for traversing movement on a pair of horizontal guides 11 formed in the bed 12 of a hobbing machine of any suitable or desired construction, such, for example, as that disclosed in Edgar Patent No. 2,152,469. The support preferably includes a saddle 13 formed with a pair of parallel guideways 14 for cooperation with the guides 11. A feed screw 15 for the hob support extends longitudinally between the guides 11 for threaded engagement with a fixed nut (not shown) in a lug 16 (Fig. 6) on the underside of the saddle 13, and may be rotatably anchored in any suitable manner on the machine bed for actuation either manually or by power.

Mounted on the top of the saddle 13 is a slide swivel or support 17 having a base 18, which preferably is generally circular in form, and mounted for rotary adjustment about a vertical axis into various desired angular positions. A direct reading micrometer dial 21 is provided on the front face of the swivel, and a clamping bolt 22 extends through the base 18 for cooperation with the saddle to secure the swivel in its adjusted angular position.

A tool slide 25 is mounted on the swivel 17 for transverse adjusting movement, and is formed with a dove-tailed guide 26 which slidably engages in a diametrical guideway 27 formed in the top of the swivel. To adjust the tool slide 25 transversely with respect to the swivel 17, it is provided with a tapped lug 29 projecting therefrom for threaded engagement with a screw shaft 30 journaled in a bracket 31 on the swivel, and extending therethrough to the front for hand actuation. A graduated dial 32 is provided on the forward end of the shaft 30 for indicating the position of the tool slide 25.

A tool spindle 35 is suitably journaled, as by a pair of alined bushings 36 and 37, in a bore 38 opening through an upstanding bearing bracket 39 on the tool slide 25 (Fig. 7). In the present instance, the inner bushing 37 is seated in a counterbore 40 formed at the right-hand end of the bore 38, this bushing having an internal taper to receive the externally tapered nose portion 41 of the spindle 35. The nose portion of the spindle has a tapered socket 42 which supports a tapered arbor 43 having a cylindrical axial recess 44 to receive the end of a mandrel 45. The spindle has an axial bore 46 extending from the inner end of the socket 42 to the outer end of the spindle. This bore receives a draw bar 47 which projects axially through the arbor for screw-threaded engagement with the end of the mandrel 45 seated within the recess 44. A collar 48, rigid on the mandrel, is adapted to be drawn into engagement with the outer end of the arbor upon rotation of the draw bar, the arbor, in turn, having a peripheral flange 49 adapted to seat against the end of the nose portion of the spindle. When the draw bar is tightened, as by means of a head 50 at its outer end engageable with the outer end of the spindle, the parts are rigidly clamped in assembled relation for rotation.

A pinion gear 53 is keyed on the outer end of the spindle and a pair of lock nuts 54 serve to hold the spindle in place and to adjust the spindle longitudinally to take up wear. A gear box 55 encloses the outer end of the bearing bracket 39 and is apertured, as at 56, to permit the outer end of the spindle to project therefrom for actuation of the draw bar 47.

The outer end of the hob-supporting mandrel 45 is mounted for rotation in a bushing 60 carried by a tailstock 61. The tailstock is adjustably carried on the tool slide 25, and in the present instance is provided with a pair of bolts 62 (Figs. 1 and 7), which engage in inverted T slots 63 formed in the top of the tool slide 25.

Any suitable hob may be mounted on the mandrel, depending upon the character of the work to be performed and, in the present instance, I have shown a hob A having a series of relieved teeth in a cylindrical pitch circle for performing a splined tooth hobbing operation on a work piece W (see Figs. 2, 3, 5, and 7). The work piece may be supported in any suitable or conventional manner on a work support (not shown), and is adapted to be driven in timed relation to the rotation of the hob spindle.

It will be evident that the swivel 17 permits the hob to be adjusted at various angles to the work corresponding to the thread angle. In the operation illustrated, the hob is positioned to cut splines 64 in the shaft W. The hob slide 25 affords a second adjustment by reason of which the hob A may be shifted transversely of the axis of the work W to suitably position the desired hob teeth for cutting. The saddle mounting on the ways 11 of the machine permits the hob A to be power fed longitudinally of the axis of the work and in any desired angular or transverse position.

Power for the hob spindle 35 is derived from a suitable source through a splined drive shaft 70 suitably mounted for rotation between the guides 11 beneath the saddle 13 (Figs. 1 and 6). The hub of a bevel gear 71 is rotatably mounted in the lug 16 on the underside of the saddle 13 and is splined for axial sliding movement on the shaft 70. The gear 71 is connected through a train of gears 72—76 to a splined spindle drive shaft 77 which is journaled in the swivel 17 within the gear box 55. The intermediate gear 74, rotatable in the swivel, is arranged to roll about the gear 73, rotatable in the saddle, so that the drive to the shaft 77 is connected in all angular positions of adjustment. The spline shaft 77 is meshed with a pinion 78, journaled in the hob slide 25, for driving engagement in all positions of transverse adjustment of the hob slide. The pinion 78 in turn drives an idler pinion 79 which meshes with the pinion gear 53 on the hob spindle 35.

As is frequently necessary in cutting toothed parts, and particularly in connection with spline shafts, the ends of the teeth are chamfered or otherwise formed. It has been customary heretofore, where such chamfered teeth are desirable, to perform two separate and distinct cutting operations, one for generating the teeth, and the other for producing the chamfer. I have provided, in the present instance, a machine capable of effecting a substantial saving of time by performing the two hobbing operations simultaneously. To this end, I have provided a second hob relatively adjustable with respect to the hob A, both hobs being mounted on the slide 25 for adjusting movement with respect to the work piece and driven in exact timed relation from a common drive shaft journaled in the slide. Thus, the hobs are mounted for conjoint movement longitudinally, angularly and transversely with respect to the axis of the work piece. The second, or chamfering hob is individually adjustable toward and away from the hob A, as well as longitudinally and angularly with respect to the axis of hob A, and is further adjustable in a plane perpendicular to the common plane of the hob axes.

In the present instance, a rigid bracket 80 on the hob slide 25 carries a slide 81 for transverse adjusting movement in guideways 82 (Fig. 1). An adjusting screw 83 is journaled for rotation in the bracket 80 and extends for screw-threaded engagement in the slide 81. A micrometer dial 85 is provided on the screw 83 for indicating the position of the slide 81 with respect to the bracket. Mounted for angular and vertical adjustment on an upstanding cylindrical trunnion 86 on the slide 81, is a hollow, generally cylindrical swivel support 87 (Figs. 1, 7 and 8). The vertical adjustment of the swivel 87 on its support 86 is effected through the agency of an adjusting screw 88 journaled for rotation in the swivel support 87 and extending for threaded engagement in the top of the trunnion 86. A graduated dial 89 indicates the vertical position of the swivel 87 with respect to the slide 81 and trunnion 86. For the angular adjustment of the swivel with respect to the slide, a guide 90 (Fig. 1) is rigid on the support 87 for vertical sliding movement in a block 91. The block 91 is mounted for horizontal movement on a guideway 92 on the top of the slide 81 to follow the angular adjusting movement of the swivel support. A clamping bolt 93 is threaded in the slide 81 and extends through an arcuate slot 94 formed in the block 91. A graduated scale 95 on the block 91 indicates the angular positions of the swivel support 87 with respect to the slide 81.

It will be apparent that by reason of the respective adjusting screws 83 and 88 and the bolt and slot arrangement 93, 94, the swivel support 87 may be adjusted longitudinally of the axis of the work, as well as vertically and angularly.

The swivel support 87 carries a bearing bracket 96 (Fig. 7), in which a hob spindle 97 is suitably journaled. In the present instance, the spindle 97 is rotatably journaled in, and axially slidable with, a bearing sleeve or quill 98 which is keyed, as at 99, for axial sliding movement in a bore 100 in the bracket 96. The quill is formed with a rack 101 (Fig. 8) which cooperates with a pinion 102 journaled in the bracket on a shaft 103 extending therefrom for wrench actuation at its squared end 104. A micrometer dial 105 indicates the position of the quill within the bracket 96. The quill 98 is internally tapered to receive rotatably an externally tapered hollow sleeve 109 which carries the spindle 97. The bearing between the quill 98 and the sleeve 109 is adjustable to take up wear by means of a nut 110, screw threaded on the sleeve, and bearing against the inner end face of the quill. The axial position of the spindle within the sleeve 109 is determined by a collar 107 rigid on the spindle and bearing through an oil retaining ring against the outer end face of the sleeve. This assembly is secured by a nut 108 bearing through a washer 111 against the inner end face of the sleeve 109 and an adjacent lock nut 106 each screw threaded on the spindle 97 for axial adjustment.

The remote, inner end of the spindle 97 is keyed for sliding movement in one end of a tubular sleeve 113 by which the spindle is rotated. The sleeve 113 is rotatably journaled in a fixed bushing 114 in the bracket 96. A hob B, clamped as by a nut 115 on the spindle 97, is positioned in the present instance with its axis substantially parallel to the axis of the hob A, and on the opposite side of the workpiece W for chamfering the end edges of the teeth produced by the hob A.

By reason of the rack and pinion adjustment of the bearing sleeve 98 and the sliding driving connection between the spindle 97 and the driving sleeve 113, it will be seen that the hob B may be adjusted transaxially of the workpiece and longitudinally with respect to the hob A.

For driving the hobs A and B in exact timed relation, I have provided means for driving the hob B from the idler gear 79, from which the spindle 35 for the hob A is driven. In the present instance, the bracket 39 on the tool slide 25 is provided with an integral bearing extension 116 (Fig. 7) within the gear box 55 and in which a shaft 117 is journaled, as by a bushing 118. A pinion gear 119 is keyed to the shaft 117 and is adapted for meshing engagement with the driving pinion 79 (Figs. 6 and 7). A flexible and expansible coupling 120 of well-known construction extends from the shaft 117 to which it is keyed, as at 121, through an aperture 122 in the gear box 55 for connection with the driving sleeve 113 as by a key 123.

In the exemplary operation illustrated, the hob A is positioned beneath the workpiece W and is adjustable transaxially thereof by means of the adjusting screw 30 to position the desired hob teeth in the cutting zone. By adjusting the swivel support 17 angularly with respect to the saddle 13, the hob A is positioned in accordance with its lead angle for cutting the splines 64 in the shaft W. The machine may be arranged in any desired manner to provide relative vertical adjustment between the saddle and the workpiece for the proper depth of cut.

As illustrated herein, the chamfering hob B is positioned above the workpiece and is spaced axially thereof with respect to the hob A. This is accomplished by means of the adjusting screw 83 which determines the position of the chamfering hob axially of the work relative to hob A. By virtue of the adjusting screw 88 the hob B may be vertically positioned with respect to the workpiece and hob A for the proper depth of cut and, by means of the adjusting means 104 this hob is appropriately positioned transaxially of the workpiece. To accommodate the lead angle of the hob B it may be adjusted angularly by means of the clamping bolt and slot arrangement 93, 94.

The hobs A and B and the workpiece W are rotated in timed relation and by means of the feed screw 15 the saddle is fed axially of the workpiece to perform the two hobbing operations. The lead of both hobs and the rotative direction of cutting is suitably arranged in accordance with the gearing employed, so that both hobs are operated in correctly timed relation with the work. The chamfering hob B is offset axially of the work from the hob A so that, as the support is fed axially of the work, the hob A, in advance of the hob B, performs its spline-cutting operation first. Near the completion of the spline-cutting operation the chamfering hob B engages and is fed into the end edges of the teeth 64 to perform the chamfering operations. Thus, the two hobbing operations are performed at once and are completed simultaneously.

It will be apparent from a consideration of the foregoing that I have provided a novel arrangement wherein a great saving of time and labor may be effected by performing two hobbing operations simultaneously on a single workpiece. The hobs A and B are driven from a common driving element, journaled within the main hob slide 25 to the end that the hobs may be rotated in exact timed relation. Furthermore, I have provided a hob supporting means whereby universal adjustment may be effected, not only as between the hobs as a unit with respect to the work piece, but also as between the hobs A and B with respect to each other.

I claim as my invention:

1. In a hobbing machine, in combination, a base, a saddle, means for feeding said saddle longitudinally of said base, a swivel mounted on said saddle for angular adjustment relative thereto, a slide mounted on said swivel for adjusting movement transversely thereof, a hob spindle rotatably mounted in said slide, a hob, a tailstock adjustable with respect to said spindle for supporting said hob between said spindle and said tailstock, a second hob, a support for said second hob movably mounted on said slide for adjusting movement axially, vertically, angularly and laterally with respect to said first hob, and a common drive for said hobs from said hob spindle.

2. In a hobbing machine, in combination, a base, a workpiece journaled for rotation in a fixed position with respect to said base, a support adjustably mounted on said base, a hob cutter mounted on said support at one side of said workpiece for cutting splined teeth in said workpiece, and a second hob mounted on said support at the opposite side of said workpiece for chamfering the ends of said teeth simultaneously with the cutting operation of the first-mentioned hob, said hobs being relatively adjustable on said support longitudinally of the axis of the workpiece.

3. In a hobbing machine having means for rotatably supporting a workpiece, the combination of a hob, means for causing relative feed movement between said hob and said workpiece axially of the latter for cutting teeth therein, a chamfering hob mounted in fixed position with respect to said first hob and positioned on the opposite side of said workpiece for simultaneously chamfering the end edges of the teeth produced by the first-mentioned hob, said first hob being positioned in advance of said chamfering hob with respect to the direction of their feed movement by an amount permitting simultaneous completion of the two hobbing operations.

4. In a hobbing machine having means for rotatably supporting a workpiece, the combination of a hob mounted for longitudinal feed movement with respect to the axis of said workpiece for cutting teeth therein, a second hob mounted for longitudinal feed movement as a unit with the first-mentioned hob and adapted to chamfer the ends of said teeth, said second hob being offset from said first hob with respect to the direction of their longitudinal feed movement, and means for adjusting the amount of said offset to conform substantially to the length of the teeth to be cut by said first mentioned hob.

5. In a hobbing machine having means for rotatably supporting a workpiece, the combination of one hob mounted for longitudinal feed movement with respect to the axis of said workpiece for cutting teeth therein, a second hob mounted for longitudinal feed movement with said one hob and adapted to chamfer the ends of said teeth, said second hob being offset axially of the workpiece with respect to said one hob, means for feeding said hobs in a direction to initiate the tooth cutting operation by said one hob first, and means for adjusting the amount of such offset to conform substantially to the length of the teeth to be cut by said first mentioned hob, whereby said hobbing operations may be completed simultaneously.

6. In a gear hobbing machine, a horizontal hob feed slide, a vertical hob support slide mounted on said hob feed slide, a hob shaft rotatively mounted on said hob support slide, a rotative drive means located backwards of said hob shaft, and a flexible shaft connecting said drive means and hob shaft, said hob shaft being mounted in a bearing, said bearing being pivotally supported to pivot in a horizontal plane, means for releasably clamping said bearing in selected pivoted positions.

STAFFORD M. RANSOME.

REFERENCES CITED

The following references are of record in the file of this patent:

UNITED STATES PATENTS

| Number | Name | Date |
|---|---|---|
| 1,035,511 | Zimmermann | Aug. 13, 1912 |
| 1,208,532 | Fawcus | Dec. 12, 1916 |
| 1,267,970 | Burgess | May 28, 1918 |
| 2,101,183 | Lawton | Dec. 7, 1937 |

FOREIGN PATENTS

| Number | Country | Date |
|---|---|---|
| 311,615 | Germany | Mar. 28, 1919 |